United States Patent

[11] 3,567,030

[72] Inventors Robert I. Loeffler
1200 Caddell;
Harold M. Bradbury, 1217 W. Brooks,
Norman, Okla. 73069
[21] Appl. No. 780,123
[22] Filed Nov. 29, 1968
[45] Patented Mar. 2, 1971

[54] REVERSE OSMOSIS APPARATUS
6 Claims, 3 Drawing Figs.
[52] U.S. Cl. ................................................. 210/321
[51] Int. Cl. .................................................. B01d 13/00
[50] Field of Search .................................... 210/22, 23,
321, 253, 258; 204/252, 301

[56] References Cited
UNITED STATES PATENTS
3,355,382 11/1967 Huntington .................. 210/321X
3,400,074 9/1968 Grenci ........................... 210/321

Primary Examiner—Reuben Friedman
Assistant Examiner—Richard Barnes
Attorney—Dunlap, Laney, Hessin & Dougherty ABSTRACT: Apparatus for carrying out reverse osmosis to separate materials, the apparatus including an outer shell and an inner shell mounted inside the outer shell for rotation of the shells about a common axis. The inner shell includes a permeable osmotic membrane at its outer periphery which is located radially inwardly of an axially extending space between the shells. There are further provided spaces between the opposed ends of the inner and outer shells through which a process solution may be directed radially to and from the axially extending space. A conduit and fluid flow passageway system is provided for removing product liquid from a point immediately radially inward of the membrane and at one end of the inner shell whereby when the shells are rotated about a common axis, a pressure differential is developed across the membrane in which the lower pressure is on the radially inner side of the membrane.

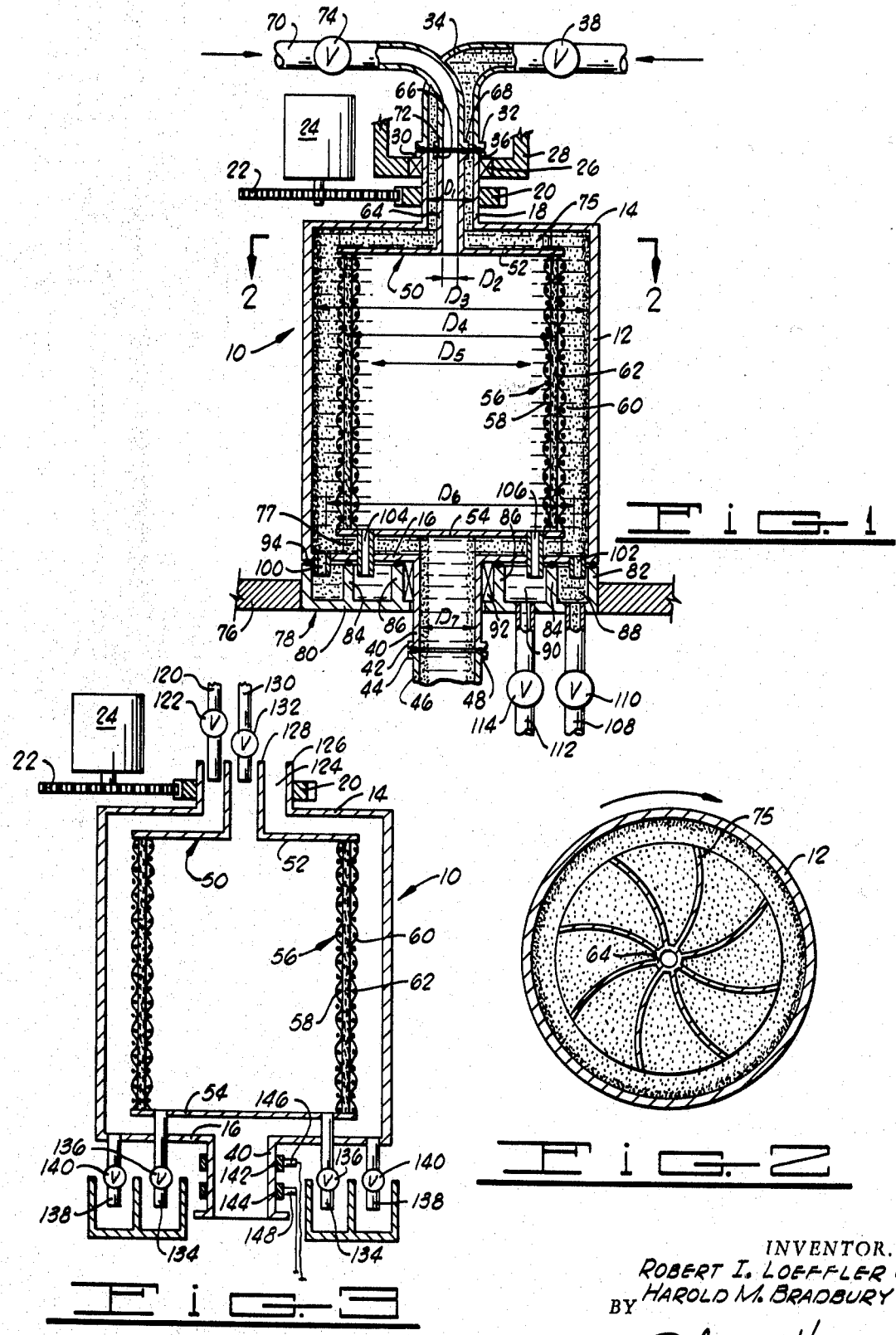

REVERSE OSMOSIS APPARATUS

BACKGROUND OF THE INVENTION

1. Field of the Invention

This invention relates to separatory devices for separating materials by the process of reverse osmosis. More particularly, this invention relates to a device for using centrifugal force to carry out reverse osmosis.

2. Brief Description of the Prior Art

It is known that relatively pure, low salt content water can be recovered from saline aqueous solutions, such as sea water, by use of the process of reverse osmosis. In this procedure, the saline aqueous solution is forced against a water-permeable membrane capable of rejecting the dissolved salts with a driving force in excess of the osmotic pressure (approximately 350 p.s.i. for sea water) to force pure water through the membrane. The flow of water under the applied hydrostatic pressure is in a direction opposite to that normally observed in osmosis. The same reverse osmosis technique can be successfully employed in recovering other solvents in a relatively pure state from their solutions.

In a recent refinement of the reverse osmosis process, it has been proposed to use a rotating membrane-supporting assembly in a manner such that liquids and suspended or dissolved solids are subjected to constant acceleration greater than gravity in a direction away from the membrane. This process is described in U.S. Pat. No. 3,355,382 to Huntington, and offers a number of advantages over more conventional reverse osmosis processes using stationary membranes.

BRIEF DESCRIPTION OF THE PRESENT INVENTION

The present invention provides an improved reverse osmosis apparatus of the rotating membrane type. One improvement of the present invention with respect to the Huntington apparatus resides in the capability of the present invention of developing the necessary pressure differential across the osmotic membrane without the use of an external pump or pressure boosting device. Broadly described, the apparatus of the present invention comprises an osmotic membrane around, and mounted for rotation about, a central rotational axis. An outer shell, which is also rotatable about the same rotational axis, is spaced radially outwardly from the osmotic membrane to define an intervening space therewith. Radially extending fluid flow passageways communicate with this intervening space at axially spaced points therealong for delivering process solution from a location near the axis of rotation to said intervening space and then returning it to a location near the axis of rotation. Means is provided for removing product liquid from the apparatus at a location which is between the axis of rotation and the membrane. By removing product liquid from this location, the hydrostatic pressure exerted by the process solution in the fluid flow passageways exceeds the opposing hydrostatic pressure exerted by the product liquid on the radially inner side of the membrane to provide the necessary driving force to effect reverse osmosis.

From the foregoing description of the invention, it will have become apparent that it is a general object of the invention to provide an improved rotating membrane reverse osmosis apparatus.

A more specific object of the invention is to provide a reverse osmosis apparatus of the rotating membrane type, which apparatus does not require any type of external pump or pressure booster to achieve the pressure necessary to overcome osmotic pressure across the membrane.

An additional object of the invention is to provide a rotating membrane reverse osmosis apparatus which includes means for recovering a substantial portion of the energy contained in the waste product stream.

A further object of the invention is to effectively reduce concentration polarization at the membrane-process solution interface in a reverse osmosis process.

Yet another object of the invention is to provide an efficient and convenient means of cleaning the osmotic membrane employed in a reverse osmosis process.

Additional objects and advantages will become apparent as the following detailed description is read in conjunction with the accompanying drawings.

BRIEF DESCRIPTION OF THE DRAWINGS

FIG. 1 is a view, partially in section and partially in elevation, of one embodiment of a reverse osmosis apparatus constructed in accordance with the present invention.

FIG. 2 is a sectional view taken along line 2–2 of FIG. 1.

FIG. 3 is a view similar to FIG. 1, but illustrating a different embodiment of the invention.

DETAILED DESCRIPTION OF A PREFERRED EMBODIMENT OF THE INVENTION

Referring to FIG. 1, the reverse osmosis apparatus constructed in accordance with the invention and there depicted includes an outer housing or shell designated generally by reference numeral 10 and including a cylindrical sidewall 12 and a pair of end walls 14 and 16. The diameter of the cylindrical sidewall is designated $D_3$. An intake duct 18 of diameter $D_1$ extends from the center of the end wall 14 and facilitates the introduction into the outer shell 10 of a process solution to be subjected to reverse osmosis. Secured around the intake duct 18 is a gear ring 20 which engages a drive gear 22 which is connected to, and driven by, a motor 24 or other prime mover. The intake duct 18 is rotatably journaled in a suitable bearing 26 supported in any suitable stationary supporting framework 28. At its outer end, the intake duct has an outwardly extending, annular flange 30 which mates with a flange 32 carried on the end of a feed duct 34. A suitable bearing and sealing element 36 permits the intake duct 18 to be rotated relative to the feed duct 34, and also functions to prevent the escape of a process fluid between the flanges 30 and 32. The feed duct 34 contains a suitable control valve 38 for controlling the flow of the process solution therethrough and into the intake duct 18.

Extending from the center of the end wall 16 of the outer shell 10 is a discharge duct 40. The discharge duct 40 has an internal diameter $D_7$ which is shown on the drawing. An outwardly extending annular flange 42 is formed on the outer end of the discharge duct 40 and is aligned with an outwardly extending annular flange 44 formed on one end of a fluid receiving duct 46. A suitable sealing and bearing element 48 is positioned between the flanges 42 and 44 so that the discharge duct 40 can rotate about an axis extending centrally therethrough while remaining in communication with the receiving duct 46.

Positioned within the outer shell 10 is an inner shell designated generally by reference numeral 50. The inner shell 50 includes an end wall 52 and an end wall 54 which are interconnected by a cylindrically shaped osmotic membrane structure designated generally by reference numeral 56. The osmotic membrane structure 56 includes a pair of supporting screens 58 and 60 which support and add mechanical strength to an osmotic membrane 62 which is positioned between the screens and extends between the end walls 52 and 54. The osmotic membrane 62 is, of course, of the semipermeable type with selectively passes the solvent of a solution in preference to the solute thereof. The diameter $D_4$ of the cylindrical osmotic membrane 62 is shown on the drawing. It will also be noted that the illustrated diameter $D_6$ is a distance measured diametrically between the midpoints of the annulus defined between the osmotic membrane 62 and the cylindrical sidewall 12 of the outer shell 10.

Extending from the end wall 52 of the inner shell 50 in an axial direction and concentrically within the intake duct 18 is a flushing duct 64. The flushing duct 64 has a diameter $D_2$ and projects from the center of the end face 52 to a point conterminous with the flange 30 carried by the intake duct 18. The outer end of the flushing duct 64 carries an outwardly extending annular flange 66 which is aligned with an annular flange 68 carried on the end of an aligned flushing conduit 70. A suitable sealing and bearing element 72 is provided between the flanges 66 and 68 to permit the duct 64 to be rotated relative to the conduit 70. A control valve 74 is provided in the conduit 70.

For the purpose of better interconnecting the inner and outer shells 10 and 50, respectively, for rotation together, and to improve the efficiency of the reverse osmosis apparatus, a plurality of arcuately curved vanes or impeller blades 75 are secured between the end wall 52 of the inner shell 50 and the end wall 14 of the outer shell 10. The vanes 75 are curved away from the direction of rotation of the shells as best illustrated in FIG. 2 where an arrow is used to indicate this direction of rotation. There are also provided similar arcuate, though reversely curved, vanes 77 between the end walls 16 and 54.

Mounted upon a stationary framework 76 adjacent the end wall 16 of the outer shell 10 is a fluid receiving manifold designated generally 78. The manifold 78 includes an end wall 80 and an annular sidewall 82 secured to the end wall 80, and aligned with the cylindrical sidewall 12 of the outer shell 10. The interior of the manifold 78 is partitioned into a plurality of concentric annular compartments by concentric annular divider walls 84 and 86. The divider walls 84 and 86 thus form an annular flushing fluid chamber 88, and an annular product liquid chamber 90. Radially inwardly of the partition wall 86, an annular bearing or journal 92 is mounted, and surrounds the discharge duct 40 to permit this duct to be rotated relative to the manifold 78. Suitable bearing and sealing elements 94 are also provided between the outer wall 82 and the partition walls 84 and 86 and the end walls 16 of the outer shell 10 so that the outer shell 10 may be rotated relative to the stationarily retained fluid receiving manifold 78.

A flushing fluid discharge port 100 extends from the annulus between the osmotic membrane structure 56 and the cylindrical sidewall 12 of the outer shell 10, and extends through the end wall 16 of the outer shell 10 into the flushing fluid chamber 88. A similar port 102 is provided on the opposite side of the outer shell 10, and also places the flushing fluid chamber 88 in communication with the annulus between the outer and inner shells 10 and 50, respectively.

A product liquid discharge port 104 extends from the end wall 54 of the inner shell 50 across the space between this end wall and the end wall 16 of the outer shell 10. The product discharge port 104 extends into the annular compartment or chamber 90 in the fluid receiving manifold 78 located between the annular divider walls 84 and 86. A similar product liquid discharge port 106 extends from the opposite side of the end wall 54 of the inner shell 50 through the end wall 16 of the outer shell 10 and into the annular compartment 90. It will be noted in referring to the drawing that the product liquid discharge ports 104 and 106 are both located relatively near to the osmotic membrane structure 56 so that product liquid is removed from the interior of the inner shell 50 as soon as it has accumulated to any significant depth on the inside surface of the osmotic membrane 62. The importance of this arrangement will be hereinafter explained in greater detail.

For the purpose of removing the flushing liquid from the flushing liquid chamber of annular compartment 88, a flushing fluid discharge conduit 108 extends outwardly from this chamber and contains a control valve 110. Similarly, for the purpose of removing product liquid from the annular compartment 90, a product liquid conduit 112 extends from this compartment and contains a control valve 114.

OPERATION

The reverse osmosis apparatus of the invention is operated by concurrently rotating the inner shell 50 and outer shell 10 about an axis extending centrally through the shells coincident with the axis of the outer cylindrical wall 12 of the outer shell 10 and also with the axis of the cylindrical osmotic membrane structure 56 of the inner shell 50. The motive power for rotation is provided by the motor of prime mover 24 acting through the gears 20 and 22.

A solution to be processed, such as a saline solution from which relatively pure water is to be recovered, is introduced to the reverse osmosis apparatus by passing the process solution through the feed duct 34 and through the annulus between the intake duct 18 and the flushing duct 64. The process solution then passes radially outwardly under the influence of centrifugal force through the space between the end wall 52 of the inner shell 50 and the end wall 14 of the outer shell 10. At this time, of course, the valve 38 is open and the valve 74 is closed. As the process solution flows by centrifugal force into the annulus between the osmotic membrane structure 56 and the outer wall 12 of the outer shell 10, the solution in the annulus is subjected to centrifugal force. The process solution finally moves in a radial direction back into the discharge duct 40 and exits from the reverse osmosis apparatus through this duct. The diameter $D_7$ of the discharge duct 40 is made slightly larger than the diameter $D_1$ of the intake duct 18. This results in a differential pressure acting axially in the annulus between the osmotic membrane assembly 56 and the outer wall 12 of the outer shell 10, with the higher pressure being upstream in the annulus. Thus, a pumping action is effected tending to move the process liquid from the intake ends to the discharge ends of the concentric shells.

The differential pressure necessary to effect reverse osmosis in the apparatus is produced as follows. The valve 110 in the flushing liquid discharge conduit 108 is closed which causes the annulus between the inner and outer shells 10 and 50 to fill with the process solution until overflow occurs through the discharge duct 40. Pressure is thus produced in the annulus along the outer surface of the osmotic membrane 62 at diameter $D_4$ according to the equations $$P_1 = 2.05 \times 10^{-9} \rho_s n^2 (D_4^2 - D_1^2) \quad (1)$$
$$P_2 = 2.05 \times 10^{-9} \rho_s n^2 (D_4^2 - D_7^2) \quad (2)$$

where $n$ is the rotational speed of the rotating inner and outer shells in revolutions per minute, $\rho_s$ is the density of the process solution in lb./ft.$^3$, the $D$ terms are diameters in inches taken across various parts of the apparatus at the locations indicated in the drawing, $P_1$ is the pressure at the upstream end of the annulus between the inner and outer shells 10 and 50 in lb./in.$^2$, and $P_2$ is pressure at the downstream end of this annulus in lb./in.$^2$. From equations (1) and (2), it will be seen that since the diameter $D_7$ is greater than the diameter $D_1$, the pressure $P_1$ is greater than the pressure $P_2$. This pressure gradient is that which has been described as producing the pumping action moving the process solution through the reverse osmosis apparatus. In a static or no-flow condition, the fluid in the annulus between the inner and outer shells would come to equilibrium when overflow through the discharge duct 40 ceases. This condition would produce a pressure $P_2$ on the entire outer surface of the membrane.

During operation of the reverse osmosis apparatus, the valve 114 is open to allow the product liquid accumulated within the annular compartment 90 to be discharged to atmospheric pressure. Thus, the product liquid on the inner surface of the osmotic membrane structure 56 within the inner shell 50 is discharged as it is produced, thereby preventing a back pressure of any substantial magnitude developing against the osmotic membrane 62 due to a liquid accumulation on the discharge side of the membrane (that is, within the inner shell 50). There is, nevertheless, a small pressure produced on the inner surface of the osmotic membrane 62 by the small hydrostatic head of product liquid there accumulated with this back pressure being represented by the equation $$P_3 = 2.05 \times 10^{-9} \rho_e n^2 (D_4^2 - D_5^2)$$

where $\rho_e$ is the density of the product in lb./ft.$^3$, and $D_4$ and $D_5$ are the diameters depicted in the drawing. Since the diameter $D_4$ as measured between the outer surfaces of the cylindrical osmotic membrane 62 is only slightly greater than the diameter $D_5$ measured between the opposed surfaces of the product liquid accumulated within this membrane, the pressure $P_3$ will be small in comparison to the pressure $P_2$ since the diameter $D_5$ is much greater than the diameter $D_7$. Thus, a differential pressure is maintained across the osmotic membrane in opposition to osmotic pressure, and provides the driving force necessary for reverse osmosis to occur.

The reverse osmosis apparatus of the invention permits a portion of the energy imparted to the process solution by the rotation of the apparatus to be partially recovered as this process solution imparts energy to the machine by exiting or being withdrawn near the center line of rotation at the diameter $D_7$ of the discharge duct 40. It may be pointed out that an additional portion of the energy inherent in the product fluid due to rotation of the apparatus can be recovered by jettisoning it against a turbine geared to the osmosis apparatus, but rotating at a lesser speed than the osmosis apparatus.

One of the principal problems usually encountered in the reverse osmosis process is concentration polarization. As a result of the occurrence of this phenomena, as the solute of the solution is rejected at the semipermeable osmotic membrane-solution interface, the solution concentration increases, causing a deterioration in the rejection capabilities of the membrane. In order to alleviate this situation and keep down the undesirable buildup in solution concentration adjacent the solution-membrane interface, it is usually necessary to flow large quantities of the solution past the membrane on a continuous basis. Moreover, fluid flow past the membrane must be maintained in the turbulent flow region in order to promote mixing and reduce concentration polarization. Thus, in most heretofore employed reverse osmosis devices, the ratio of product liquid to processed solution is very small.

In most osmotic processes, including the process of recovering fresh water from saline solutions, the concentrated solution is more dense than the dilute solution. Where such is the case, the reverse osmosis apparatus of the present invention effectively reduces concentration polarization by centrifugal action. As the solution concentration increases at the interface between the osmotic membrane 62 and the process solution, the more dense concentrated solution is moved outwardly in the annulus between the inner and outer shells 10 and 50 by centrifugal force, and is replaced by the less dense or more dilute solution. In other words, concentrated solution therefore moves outwardly away from the osmotic membrane 62, while the less dense solution moves toward the membrane. This self-cleansing action will allow operation with greater ratios of product liquid to process solution without significant deterioration of the membrane rejection capablities as a result of concentration polarization.

Another important feature of the present invention is the susceptibility of the apparatus to efficient cleaning of the membrane from time to time. This is accomplished by backwashing the membrane; that is, periodically flushing the membrane by causing a suitable washing liquid to flow through the membrane in a direction opposite to the flow during the occurrence of the reverse osmosis process. This flushing is effected by closing the valves 38 and 114 while opening the valves 74 and 110. A suitable washing fluid, such as relatively pure water, is then introduced to the interior of the inner shell 50 by passing it through the flushing conduit 70 and the flushing duct 64. The interior of the inner shell 50 is filled until a sufficient head is developed to produce a flushing pressure against the inner surface of the osmotic membrane 62. The maximum flushing pressure which can be developed within the inner shell 50 may be termed $P_5$ and occurs when the flushing liquid fills the inner shell between the osmotic membrane 62 and the opening into the inner shell from the flushing duct 64. This pressure $P_5$ may be calculated by the equation $$P_5 = 2.05 \times 10^{-9} \rho w n^2 (D_4^2 - D_2^2)$$

where $\rho w$ is the density of the wash or flushing liquid in lb./ft.$^3$. The flushing liquid is thus driven through the membrane 62 into the annulus between the outer and inner shells 10 and 50, respectively, and is then discharged through the flushing fluid discharge ports 100 and 102 into the flushing fluid chamber of annular compartment 88 in the fluid receiving manifold 78. With the valve 110 opened, the flushing liquid is vented from the flushing liquid chamber 88 to atmospheric pressure. The annulus between the inner and outer shells 10 and 50 does not remain full of the flushing liquid during this mode of operation of the apparatus since its feed through the valve 38 is cut off, and the washing or flushing liquid is discharged immediately after passing through the membrane.

In a few cases where a concentrated solution is less dense than a dilute solution, it is obvious that the function of the valves 38, 74, 110 and 114 could be reversed to maintain all of the previously described properties and functions of the reverse osmosis apparatus. In this case, however, it would be necessary to provide an exit orifice in the end wall 54 of the inner chamber 50 to remove liquid from this chamber.

In FIG. 3 of the drawings, there is illustrated another embodiment of the invention which offers some operational advantages as compared to the embodiment depicted in FIG. 1. Here the outer and inner shells are constructed substantially identically to these shells in the FIG. 1 embodiment, and therefore identical reference numerals have been used to designate the various parts of the shells. The concentric shells 10 and 50 are mounted for rotation about a vertical axis so that liquid flow through the device may occur by gravity. In this position, it is only necessary to project one end of a process solution feed pipe 120 containing a control valve 122 into the annular space 124 located between a process solution intake duct 126 and a flushing liquid intake duct 128 which project from the end walls 14 and 52 of the outer and inner shells 10 and 50, respectively. No seal between the pipe 120 and either of the ducts 126 or 128 is required. The same advantage is realized by merely projecting one end of a flushing liquid feed pipe 130 containing a control valve 132 into the flushing liquid intake duct 128.

For the purpose of discharging product liquid from the reverse osmosis apparatus depicted in FIG. 3, a pair of product liquid discharge pipes 134 extend from points in the end wall 54 of the inner shell 50 which are just inside the osmotic membrane structure 56. The product liquid discharge pipes 134 extend through the end wall 16 of the outer shell 10 and carry control valves 136 for controlling the flow of product liquid therethrough. In the illustrated embodiment of the invention, the control valves 136 are electrically actuated. Flushing liquid discharge pipes 138 communicate with the annulus between the shells 10 and 50 and project from the end wall 16 of the outer shell. The flushing liquid discharge pipes 138 contain control valves 140, which are shown as electrically actuated.

At some appropriate location on the outer shell 10 or on the discharge duct 40, a pair of electrically conductive slip rings 142 and 144, which are insulated from the shell or discharge duct, and from each other, contact a pair of electrical brushes 146 and 148, respectively. The brushes 146 and 148 are connected in appropriate electrical control circuitry (not shown), and the slip rings are electrically connected by suitable leads to the control valves 136 and 140. The operation of the control valves 136 and 140 can thus be effected from a remote location.

In the operation of the embodiment of the invention illustrated in FIG. 3, the shells 10 and 50 are concurrently rotated and the process solution is introduced via the process solution feed pipe 120 to the annulus between the inner and outer shells. Product liquid is removed from the inner side of the membrane structure 56 through the discharge pipes 134. The product liquid is discharged into any suitable open-topped annular trough or channel and is then removed from such trough or channel in any suitable manner. Passed-through process solution is removed from the discharge duct 40 in the same way.

When it is desired to clean the membrane 62, this is accomplished by closing the valve 122, and opening the valve 132 to permit flushing liquid to pass into the inner shell 50 and stop the flow of process solution into the annulus between the two shells. At this time, appropriate electrical control signals close the control valves 136 and open the control valves 140. Then as the flushing liquid passes through the membrane 62 into the annulus between the shells 10 and 50, it is free to flow by gravity from this space through the flushing liquid discharge pipes 138. An open-topped trough or channel (not shown) can be employed to receive the discharging flushing liquid.

It will be perceived that no fluid receiving manifold is required in the FIG. 3 embodiment of the invention, and that the seals required at various points in the FIG. 1 embodiment of the invention are eliminated. The power requirement for driving the concentric shells in rotation is thus substantially reduced in the FIG. 3 embodiment as compared to the FIG. 1 embodiment. The energy consumption of the device can be further reduced by jettisoning the product fluid against a turbine in the manner hereinbefore described.

From the foregoing description of the invention, it will have become apparent that this invention provides an improved process and apparatus for recovering or winning a relatively pure liquid solvent from a process solution by use of the principles of reverse osmosis. The apparatus which is provided does not require any external pumps in order to achieve the pressure necessary to overcome osmotic pressure and move the solvent across the membrane to the interior of the rotating osmotic membrane. Moreover, a substantial portion of the energy imparted to the process solution by the rotating apparatus is recovered and energy input requirements are thereby minimized. Finally, the apparatus permits periodic and automatic flushing of the membrane to maintain it in a state of high cleanliness without shutdown of the device.

We claim:

1. A reverse osmosis apparatus comprising:
    an outer shell having an outer wall;
    an inner cylindrical shell inside said outer shell and having a cylindrical outer wall and end walls at opposite ends of said outer wall;
    an osmotic membrane forming at least a portion of the cylindrical outer wall of said inner cylindrical shell;
    a first end wall spaced from one end wall of said cylindrical inner shell and closing an end of said outer shell;
    a second end wall spaced from the other end wall of said cylindrical inner shell and closing the opposite end of said outer shell;
    means keying said outer shell to said inner shell for concurrent rotation therewith;
    means for rotating said inner and outer shell about a common axis extending concentrically within said inner cylindrical shell along the axis thereof;
    means for conveying a flushing liquid through said outer shell to the interior of said inner shell;
    means for removing a flushing liquid from the space between the outer walls of said inner and outer shells;
    means for continuously conveying a process solution to and away from the space between the outer walls of said inner and outer shells during rotation of said inner and outer shells and over a path which is substantially radial with respect to the axis of rotation of the inner and outer shells; and
    a product fluid conduit extending through said second end wall of said outer shell and through one end wall of said inner shell at a location spaced radially inwardly from said membrane by a radial distance less than the radial distance over which said process solution is continuously conveyed to, and away from, said space between the outer walls of said inner and outer shells.

2. A reverse osmosis apparatus comprising:
    an outer cylindrical shell;
    an inner cylindrical shell disposed concentrically within said outer cylindrical shell and defining an annulus between the outer wall of the inner cylindrical shell and the outer wall of the outer cylindrical shell;
    an osmotic membrane forming at least a portion of the outer wall of said inner cylindrical shell;
    end walls on said inner cylindrical shell;
    end walls on said outer cylindrical shells spaced from the end walls on said inner cylindrical shell and defining fluid flow passageways extending to said annulus for feeding a process solution to said annulus and for removing a process solution from said annulus as said shells are rotated about a common rotational axis;
    means for rotating the inner and outer shells concurrently about a common rotational axis extending through said inner shell;
    means for continuously conveying a process solution between the pair of end walls of said inner and outer shells along a substantially radial path to and away from the annulus between said inner and outer shells; and
    means for continuously removing product fluid from a location on the opposite side of said membrane from said annulus at a location such that a liquid pressure differential exists across the membrane producing reverse osmosis, said means for continuously removing product fluid comprising a product fluid conduit extending through an end wall of said outer shell and through one end wall of said inner shell to communicate with the interior of said inner shell at a location which is spaced radially inwardly from said membrane by a distance which is less than the radial distance over which said process solution is continuously conveyed to, and away from, the annulus between said inner and outer shells.

3. A reverse osmosis apparatus as defined in claim 2 and further characterized as including:
    means for conveying a flushing liquid through the end wall of the outer shell, and through the end wall of said inner shell into the interior of said inner shell; and
    means for removing said flushing liquid from the annulus between said inner and outer shells.

4. A reverse osmosis apparatus as defined in claim 2 and further characterized to include means for developing a pressure gradient in the annulus between said shells with a higher pressure existing in said annulus adjacent one of the end walls of said outer shell than exists adjacent the other end wall of said outer shell.

5. A reverse osmosis apparatus as defined in claim 1 and further characterized to include means for developing a pressure gradient in the space between said membrane and said first-mentioned shell with a higher pressure existing in said space adjacent said first end wall than exists in said space adjacent said second end wall.

6. A reverse osmosis apparatus as defined in claim 5 wherein said means for developing a pressure gradient comprises:
    an intake duct located concentrically about said axis of rotation, projecting from said first end wall, and communicating with the space between said first end wall and said one end of said cylindrical inner shell; and
    a discharge duct located concentrically about said axis of rotation, projecting from said second end wall, and communicating with the space between said second end wall and said other end of said cylindrical inner shell, said discharge duct having a diameter which is larger than the diameter of said intake duct.